United States Patent Office 3,278,223
Patented Oct. 11, 1966

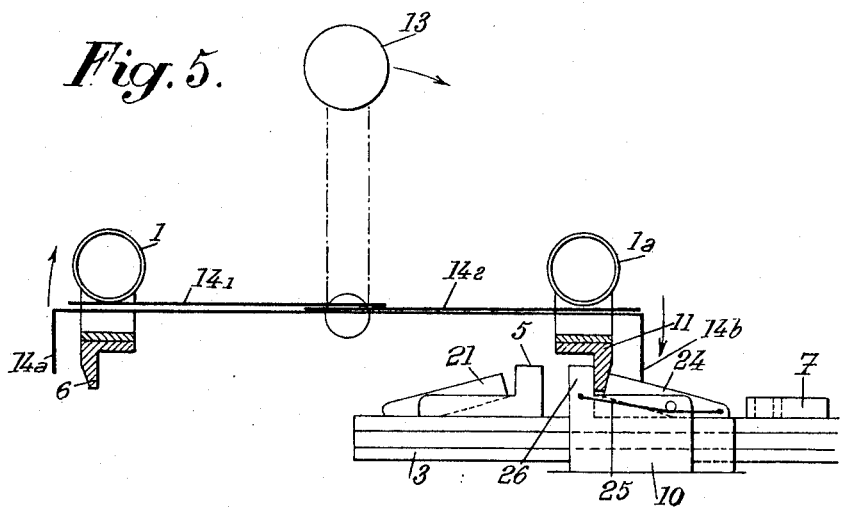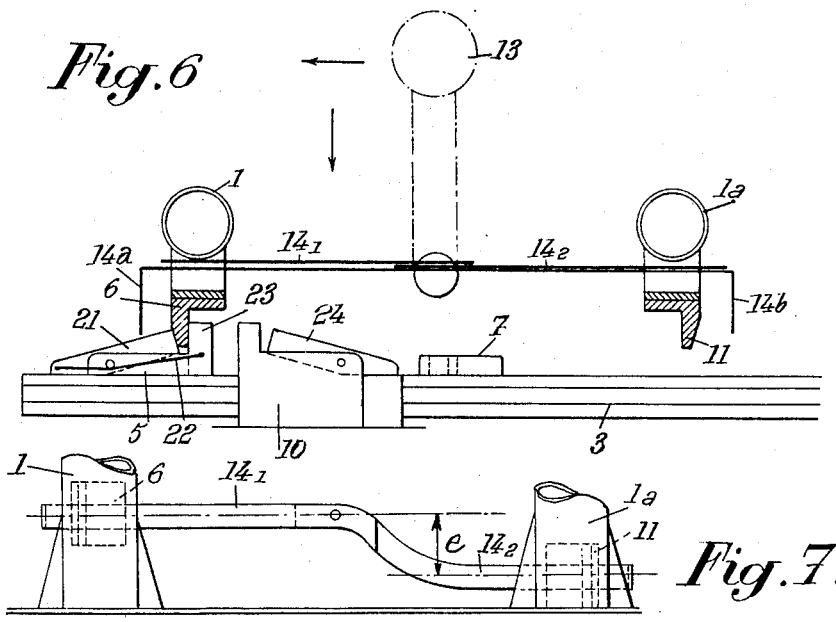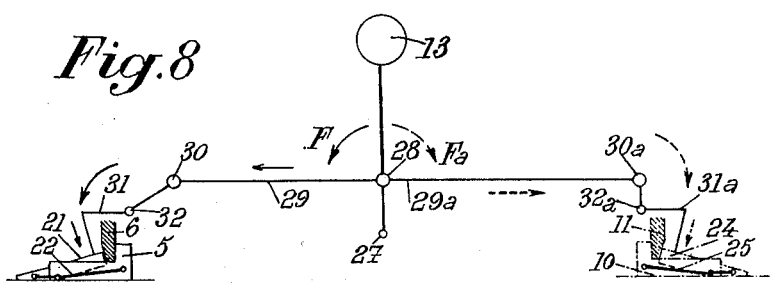

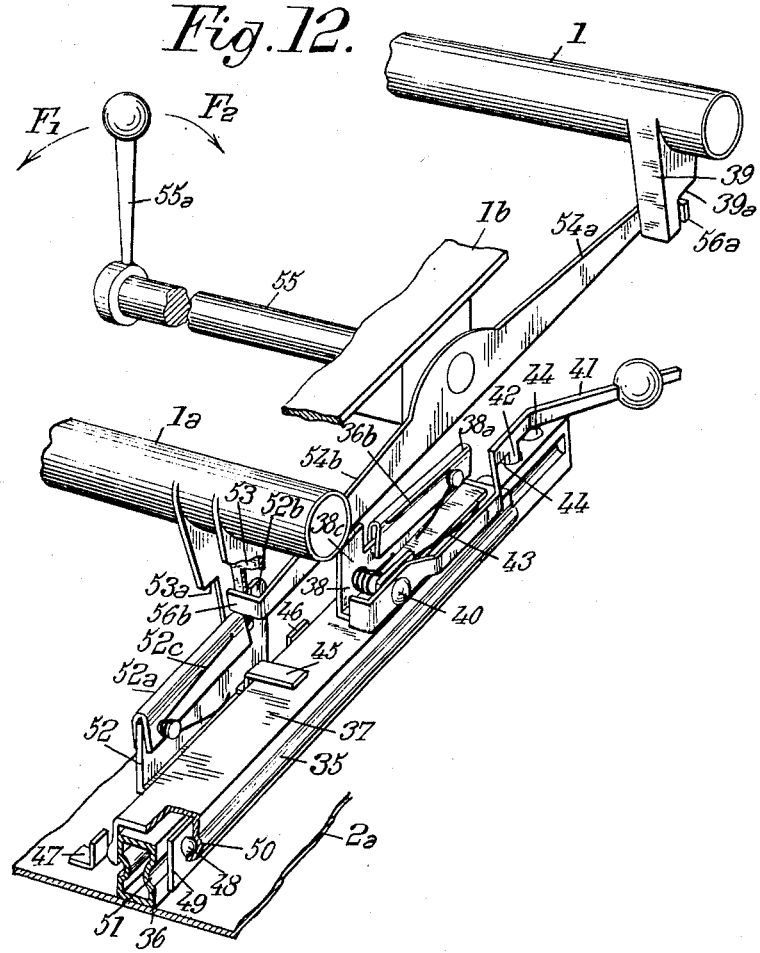

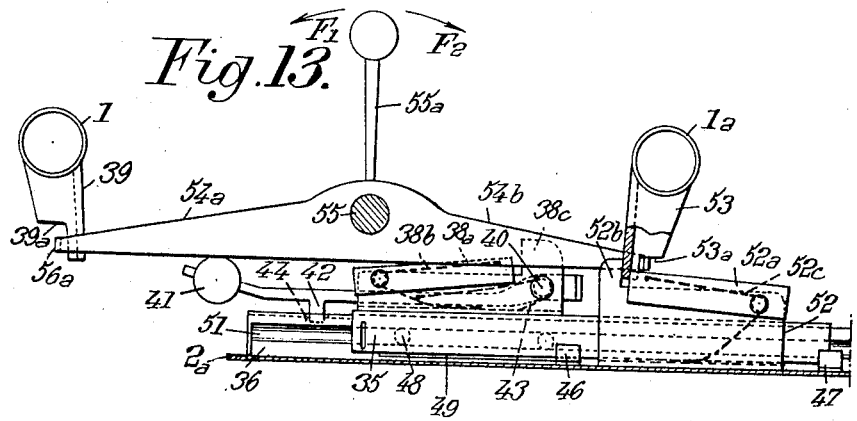
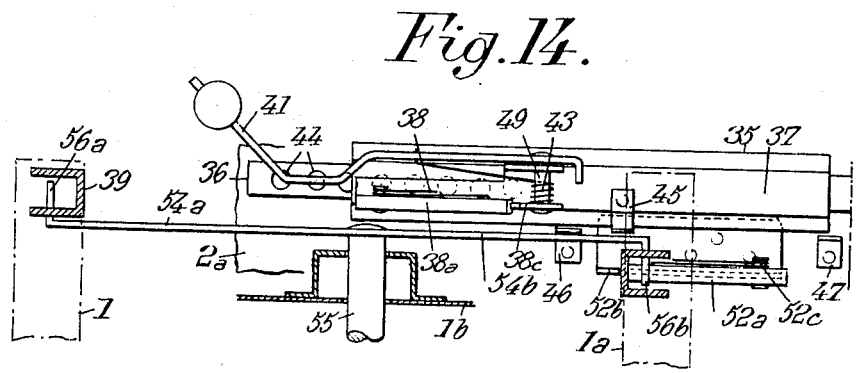
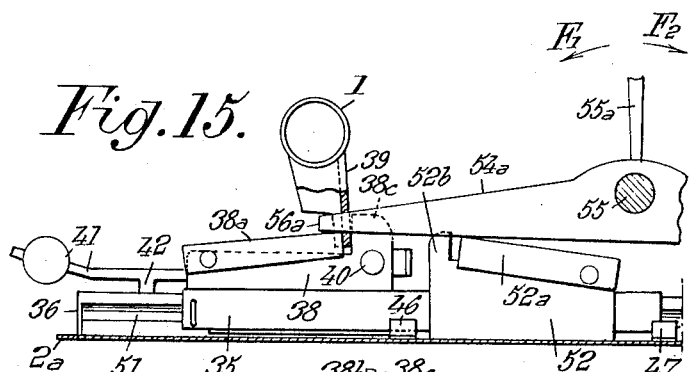
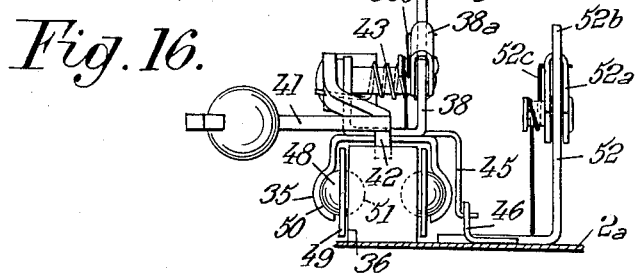

3,278,223
**DEVICES FOR THE FIXATION OF AN AUTO-
MOBILE VEHICLE FRONT SEAT**
Paul Panhard, Paris, France, assignor to Société Anonyme
des Anciens Établissements Panhard & Levassor, Paris,
France, a society of France
Filed Nov. 19, 1963, Ser. No. 324,735
Claims priority, application France, Nov. 27, 1962,
916,781; Sept. 12, 1963, 947,364
8 Claims. (Cl. 296—65)

The present invention relates to devices for the fixation of an automobile vehicle front seat in such manner as to permit of displacing this seat in the longitudinal direction of the vehicle from a normal position called "driving position" to a temporary position, called "retracted position" in order to permit an easier access to the rear of the vehicle.

The chief object of the present invention is to provide a device which simplifies the operation to be performed in order to return the front seat to its driving position.

According to the present invention the device comprises a part movable on longitudinal guiding means and which may be secured on the one hand to the seat through a first locking mechanism and on the other hand to the frame of the vehicle in at least two different positions corresponding to two driving positions, through a second locking mechanism.

Preferably the device according to the present invention further comprises a third locking mechanism through which the seat in the retracted position may be secured to the frame of the vehicle.

Owing to such an arrangement it is possible to bring the seat into retracted position from a given driving position and then to return it without adjustment to said driving position.

Preferred embodiments of the present invention will be hereinafter described with reference to the appended drawings, given merely by way of example, and in which.

Figure 9:
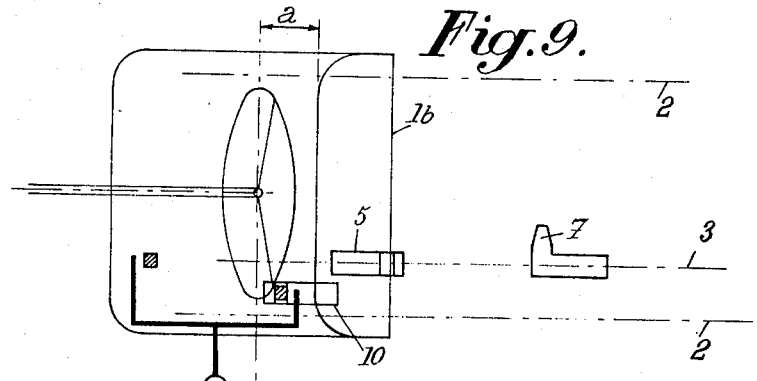
Figure 10:
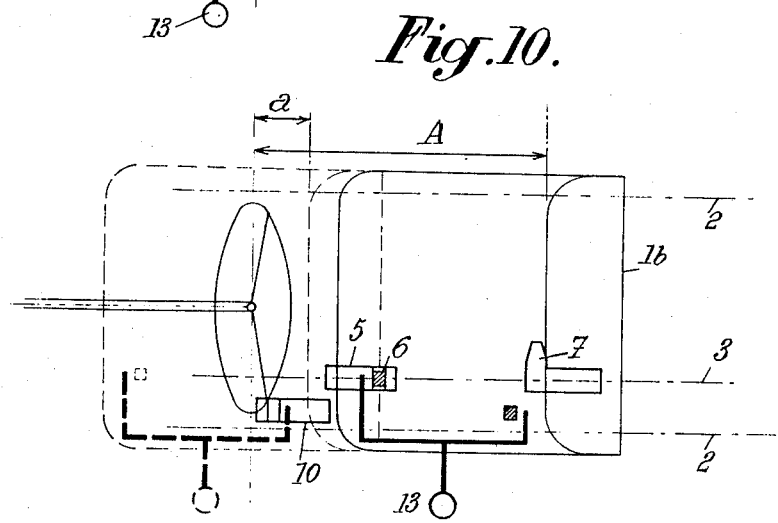
Figure 11:
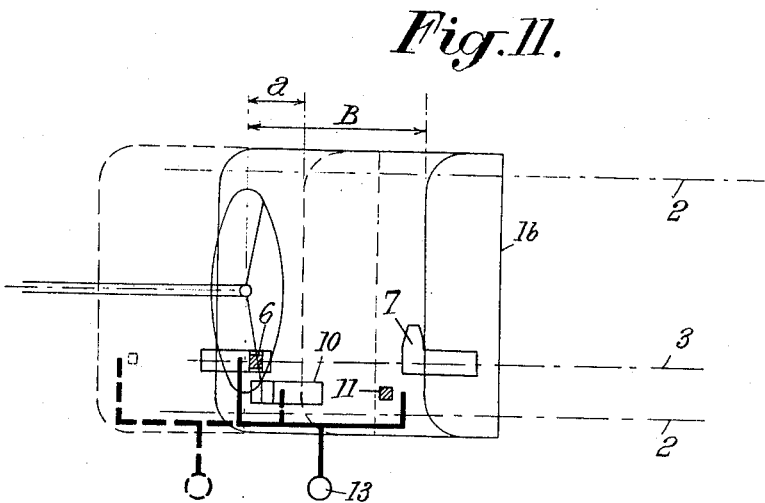

FIGS. 5 and 6 diagrammatically show, in elevational view, one of the device according to the present invention respectively in the retracted position and in the driving position;

FIG. 7 is a plan view corresponding to FIGS. 5 and 6;

FIG. 8 is an elevational view of a modification;

FIG. 9 diagrammatically shows in plan view the seat of the device according to this invention in retracted position;

FIGS. 10 and 11 are views similar to FIG. 9 showing the seat in two different driving positions respectively;

FIG. 12 is a perspective view of a second embodiment of the device according to the present invention;

FIGS. 13 and 14 diagrammatically show, respectively in elevational view and in plan view with parts in section, the device of FIG. 12 in the retracted position;

FIG. 15 is a part elevational view, with portions in section, of the same device in one of its driving positions;

FIG. 16 is a part end view of the same device.

The seat proper may be of any suitable construction as diagrammatically shown at $1b$ in FIGS. 9, 10 and 11. On the other figures the seat is represented by two tubes, a front one 1 and a rear one $1a$. The longitudinal displacements of the seat take place on slideways 2 fixed to the floor $2a$ of the vehicle.

According to the embodiment of FIGS. 1 to 11 inclusive, the device according to the present invention comprises the following elements:

A slideway 3 parallel to slideways 2 and along which a sliding member 4 is movable;

A first locking mechanism comprising a locking member 5 carried by sliding member 4 and adapted to be secured to a finger 6 carried by tube 1 so that the seat is secured to sliding member 4;

A second locking mechanism comprising a finger 7 carried by sliding member 4 and normally engaged in one of the notches 8 of a rack 9 connected to floor $2a$ so as to be fixed with respect thereto in the longitudinal direction;

A third locking mechanism comprising a locking member 10 secured to floor $2a$ and adapted to cooperate with a finger 11 rigid with tube $1a$ so as to secure the seat in the end forward position thereof, that is to say in the retracted position.

In order to adjust the seat in the desired driving position and also in order to permit of shifting from this driving position to the retracted position and reversely, two control levers 12 and 13 are provided.

Figure 1:
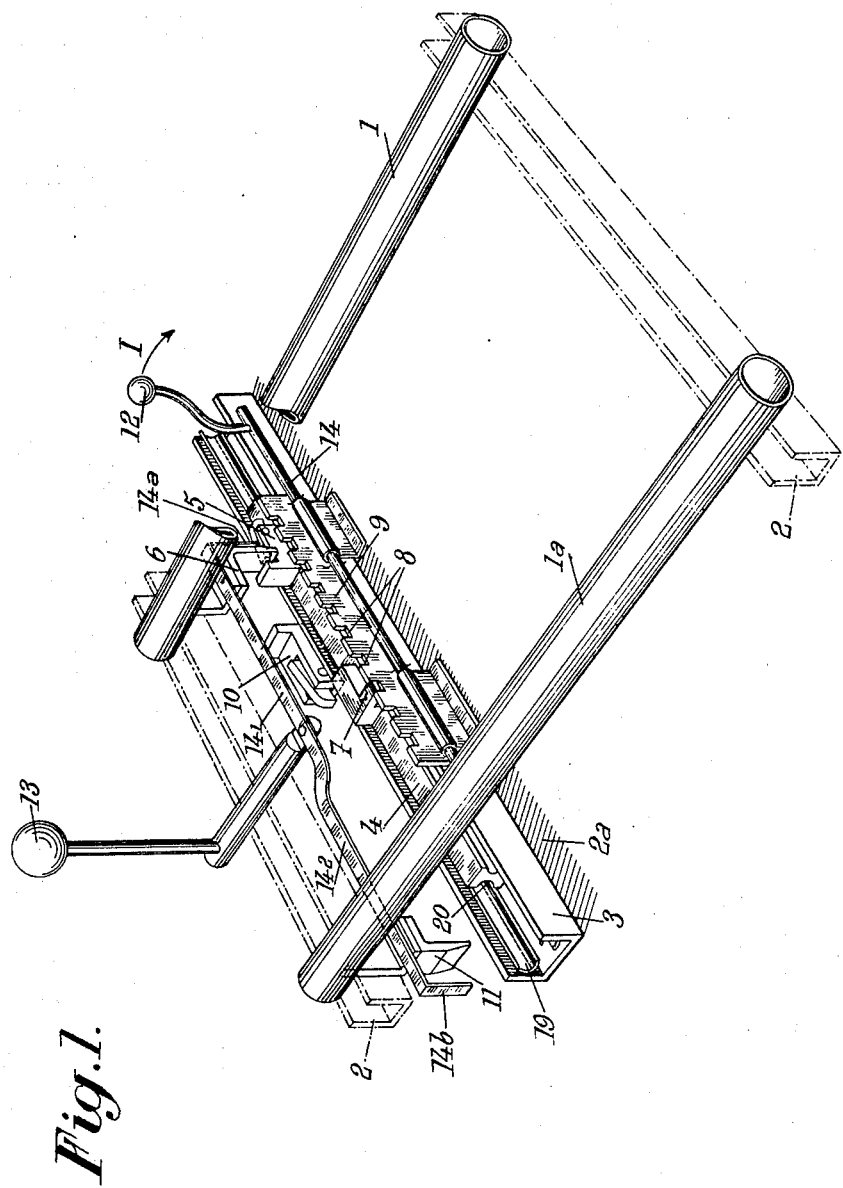
FIG. 1 is a perspective view of a first embodiment of the device according to the present invention.
Figure 2:
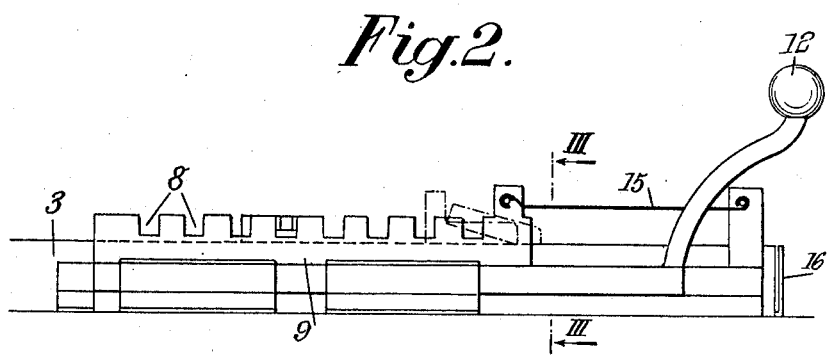
FIG. 2 is an elevational view of the rack and of the sliding member of this device.

A control lever 12 permits, when rotated in the direction of arrow I (FIG. 1), of retracting rack 9, which is rotatable about the axis of a longitudinal shaft 14. This movement clears the finger 7 of sliding member 4 from the notch 8 in which it was engaged and permits of moving sliding member 4 longitudinally by means of seat $1b$, toward the front or toward the rear into another driving position as may be desired, corresponding to another notch 8 for the engagement of finger 7 thereinto. Lever 12 and rack 9 are returned into vertical position by a spring 15 fixed at one end to slideway 3 and at the other end to rack 9 (FIG. 2). Thus the number of driving positions of the seat is equal to the number of notches 8 in rack 9.

Figure 3:
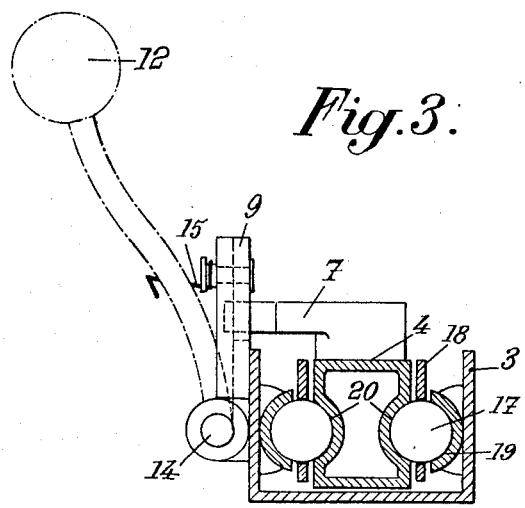
FIG. 3 is a section on the line III—III of FIG. 2.
Figure 4:
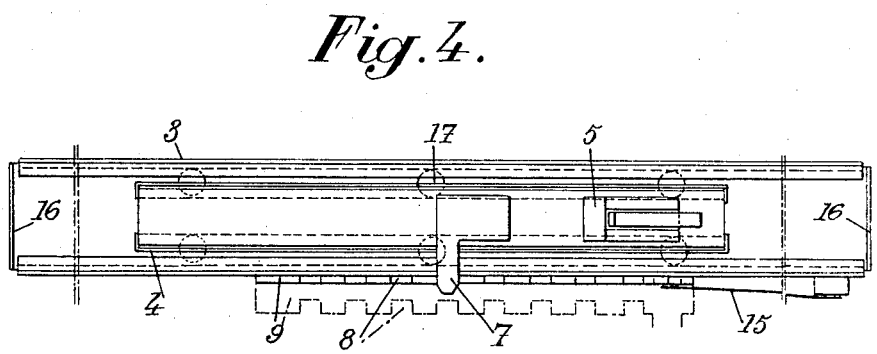
FIG. 4 is a plan view corresponding to FIGS. 2 and 3.

As shown by FIG. 3 the displacements of sliding member 4, which are limited at both ends of slideway 3 by abutments 16 (FIG. 4), are guided by balls 17 maintained by cages 18 and movable on the one hand in longitudinal semi-cylindrical guides 19 fixed to the inner faces of the vertical walls of slideway 3 and, on the other hand, in longitudinal guides 20 provided in the side walls of sliding member 4.

As for control lever 13, carried by seat $1b$, it carries, rigidly fixed thereto, two arms $14_1$ and $14_2$ which are to cooperate, through their bent ends $14a$ and $14b$, with locking members 5 and 10. As said locking members 5 and 10 are located on two different logitudinal lines, arms $14_1$ and $14_2$ are located along said lines at a distance $e$ from each other, as shown by FIG. 7.

When (FIG. 6) seat $1b$ is in the desired driving position, finger 6, rigid with tube 1, is engaged against locking member 5. By giving lever 13 the displacement indicated by the arrows of FIG. 6 the bent end $14a$ of arm $14_1$ bears against a retractable finger 21 carried by locking member 5 so as to retract said finger downwardly against the action of return spring 22. It is then possible to move the seat frontwardly (any movement toward the rear being prevented by a shoulder 23 of locking member 5). If seat $1b$ is moved forward to its retracted position (FIG. 5), finger 11, rigid with tube $1a$, comes into cooperation with locking member 10, moving down the pivoting element 24 of said member 5 against the action of its return spring 25. Finger 11 is then held in contact with the abutment 26 of locking member 10. In order to return seat $1b$ to the driving position it suffices to give lever 13 a displacement as indicated by the arrows of FIG. 5 so that the bent end $14b$ of arm $14_2$ retracts pivoting member 24, thus permitting rearward displacement of the seat.

It results from what precedes that, whatever be the driving position that is chosen (the distance from the back of the seat to the driving wheel being for instance A or B as shown by FIGS. 10 and 11 respectively), the retracted position is always the same since the position of locking member 10 is fixed. This retracted position corresponds to a distance a from the seat back to the driving wheel (as shown by FIG. 9).

It may be advantageous to replace the system formed by arms $14_1$ and $14_2$ by a system consisting of rods and levers, as shown by FIG. 8. Lever 13, which is pivotable about a fixed point 27, is pivotally connected at a point 28 with two links 29 and 29a pivotally connected at their other ends, at 30 and 30a, with two crank arm levers 31 and 31a pivotable about fulcrums 32 and 32a, respectively. It will be supposed, in FIG. 8 that the seat is in driving position, that is to say that finger 6 is in cooperating engagement with locking member 5 (left hand end of FIG. 8, shown in solid lines). In order to release the seat from this position, lever 13 is moved in the direction of arrow F. Lever 31 then pivots about fulcrum 32 in the direction of the arrows in solid lines which lowers member 21 against the action of its return spring 22. It is then possible to move the seat frontwardly into the retracted position, where finger 11, also carried by the seat, comes into engagement with locking member 10 (right hand side of FIG. 8, in dotted lines). Lever 31a then pivots about fulcrum 32a in the direction of the arrows in dotted lines, thus lowering pivoting member 24 against the action of its return spring 25. The seat can then be returned into driving position.

The second embodiment of the invention is illustrated by FIGS. 12 to 16. In this case the part movable along longitudinal guiding means, i.e. the part corresponding to sliding member 4 in the preceding embodiment, consists of a piece 35 having an inverted U cross section, slidable along a longitudinal rail 36 fixed to the floor 2a of the vehicle.

Piece 35 carries on its upper face 37 the first locking mechanism, comprising a locking member 38 having a retractable part 38a and adapted to cooperate with a finger 39 rigid with tube 1 and extending downwardly, so as to fix the seat with respect to said sliding member 35.

Locking member 38 further carries a horizontal spindle 40 extending at right angles to the direction of the displacements of the seat and on which is pivoted a lever 41 provided with a downward finger 42. Lever 41 is urged in the downward direction by a spring 43, so as to engage said finger 42 into one of a series of holes 44 provided in the upper face of rail 36, whereby sliding member 35 and (if finger 39 is in engagement with locking member 38) the seat are secured in fixed position with respect to the vehicle.

Each of the holes 44 defines a given driving position and to shift from one of these positions to another one it suffices (finger 39 being still engaged in locking member 38) to pull, by means of lever 41, finger 42 from the hole 44 in which it was engaged and to move longitudinally the seat, that is to say member 35 and lever 41, said member being driven owing to the fact that finger 39 has engaged locking member 38, this operation bringing finger 42 opposite that of the holes which corresponds to the new driving position that has been chosen.

The displacement of member 35 with respect to rail 36 are limited in both directions by the cooperation of an extension 45 of member 35 with one or the other of two parts 46 and 47 (visible in FIG. 14) secured to floor 2a at points where the engagement of extension 45 with either of parts 46 and 47 corresponds, respectively, to the maximum forward and rearward driving positions. Of course all the holes 44 may be used.

In order to facilitate the displacements of member 35 with respect to rail 36, there is interposed, as shown by FIGS. 12 and 16, between said member and said rail, a plurality of balls 48 maintained by cages 49 and rotatable on the one hand in semi-cylindrical recesses 50 provided longitudinally in the side walls of member 35 and on the other hand in semi-cylindrical recesses 51 provided longitudinally in the side walls of rail 36.

The whole of lever 41 and holes 44 thus constitutes the second locking mechanism in the present embodiment of the invention.

Advantageously, as shown, the device further comprises a third locking mechanism, consisting of a locking member 52 provided with a retractable part 52a, analogous to the above mentioned locking member 38, which is carried by the vehicle frame and is adapted to cooperate with a finger 53 carried by tube 1a and extending downwardly. The position of locking member 52 is such that the fact of engaging it with finger 53 has for its effect to fix the seat in retracted position.

In order to shift the seat from a given driving position to the retracted position and reversely, use is made of a lever including two arms 54a and 54b carried by the seat and secured to an axis 55 provided with a handle 55a. Each of the lever arms 54a and 54b has a bent end 56a and 56b respectively. These ends are to fit respectively in recesses 39a and 53a of fingers 39 and 53.

When the seat is in the retracted position, finger 53 is engaged with locking member 52 or, to be more accurate, the lower end of said finger is fixed in the space between an upright 52b of locking member 52 and retractable part 52a. The bent end 56b is then located above said part 52a, which is urged upwardly by a spring 52c.

In order to return the seat from the retracted position, it suffices to push handle 55a in the direction where the seat is to be displaced, which has for its effect to impart to said handle, to axis 55 and to said lever having two arms 54a and 54b, a rotation in the direction of arrow $F_1$ (FIGS. 12, 13 and 15). The bent end 56b then comes to retract part 52a in the downward direction against the action of spring 52c. From this time on, finger 53 is no longer held in position by locking member 52 and the seat can be moved toward the rear. The lower end of finger 37 then comes into contact with the retracted part 38a of locking member 38 and lowers said part against the action of spring 38b. Once the lower end of finger 39 has been engaged into the space between a portion 38c of locking member 38 and retractable part 38a, the seat is secured in the driving position.

Return to the retracted position takes place in the reverse manner, once finger 39 has been released from locking member 38 by pushing handle 55a in the direction of the retracted position, which has for its effect to impart to said handle a rotation in the direction of $F_2$ (FIGS. 12, 13 and 15), as a consequence of which retractable part 38a is lowered by means of the bent end 56a.

According to a modification, on the one hand if the locking member of the first locking mechanism is disposed in the opposed direction and on the other hand if the locking member of the third locking mechanism is disposed in the opposed direction and is located more to the rear, the device according to the present invention is made such as to permit displacement between said driving position and a retracted position corresponding then to a maximum rearward displacement of the seat, which enables big size persons to take place more easily.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. In an automobile vehicle, the combination of a floor, at least one front seat, longitudinal guiding means for said seat fixed to said floor, supporting means fixed with respect to said seat adapted to cooperate with said guiding means, whereby said seat can be moved longitudinally along said guiding means between an end position, called retracted position, and any of a plurality of other positions, called driving position, a longitudinal slideway fixed to said floor, an intermediate sliding member slidable along said slideway and said sliding member being distinct from said guiding means, adjustable means for securing said sliding member to said slideway in any of a plurality of relative positions, said last mentioned positions corresponding to said driving positions, respectively, and releasable coupling means carried by said sliding member and said seat respectively, for fixing said two last mentioned parts with respect to each other in a single given relative position, adjustment of the seat driving position being then possible by securing said sliding member in the desired relative position with respect to said slideway whereas, when said coupling means is released into inoperative position, said seat can be moved along said guiding means, into said retracted position, irrespective of the adjustment of said securing means.

2. A device according to claim 1 wherein said sliding member is a piece having its cross section in the form of an inverted U, said slideway being a longitudinal rail on which said piece is slidable, two elements fixed with respect to said floor, the displacements of said member being limited in both directions by contact thereof, with either of said elements.

3. A device according to claim 1 wherein said slideway is a longitudinal rail and said sliding member includes a finger adapted to be introduced into one of a series of holes provided in the upper face of said rail.

4. In an automobile vehicle, the combination of a floor, at least one front seat, longitudinal guiding means for said seat fixed to said floor, supporting means fixed with respect to said seat adapted to cooperate with said guiding means, whereby said seat can be moved longitudinally along said guiding means between a front position, called retracted position, and any of a plurality of rear positions, called driving positions, a locking mechanism comprising a locking member fixed with respect to said floor and a finger rigid with said seat adapted to cooperate with said locking member for releasably securing said seat with respect to said floor in said retracted position, a longitudinal slideway fixed to said floor, a sliding member slidable along said slideway, another locking mechanism comprising a locking member fixed to said sliding member and a finger rigid with said seat adapted to cooperate with said last mentioned locking member, and means for securing said sliding member in any of a plurality of positions along said slideway, said last mentioned positions corresponding to said driving positions, respectively.

5. A device according to claim 4 further comprising a lever operatively connected with said seat for shifting it from the driving position it occupies to the retracted position or reversely.

6. A device according to claim 4 further comprising a lever rigid with said seat and having, fixed thereto, two arms parallel to each other and extending in opposite directions and the respective ends of which are bent to cooperate with said fingers respectively.

7. A device according to claim 4 further comprising a lever rigid with said seat and having, fixed thereto, two arms in line with each other and having bent ends, respectively, adapted to cooperate with said two locking mechanisms respectively.

8. In an automobile vehicle, the combination of a floor, at least one front seat, longitudinal guiding means for said seat fixed to said floor, supporting means fixed with respect to said seat adapted to cooperate with said guiding means, whereby said seat can be moved longitudinally along said guiding means between an end position, called retracted position, and any of a plurality of other positions, called driving position, a longitudinal slideway fixed to said floor, a sliding member slidable along said slideway, a locking member fixed to said sliding member, a finger rigid with said seat adapted to cooperate releasably with said locking member, and means for securing said sliding member to said slideway in any of a plurality of relative positions, said last mentioned positions corresponding to said driving positions, respectively, said last mentioned means comprising a rack parallel to said slideway, said rack being fixed with respect to said floor in the longitudinal direction but being rotatable with respect thereto by rotation about a longitudinal axis, said sliding member including a finger adapted to cooperate with any of the notches of said rack.

References Cited by the Examiner

UNITED STATES PATENTS 2,715,433  8/1955  Dolgorukov _____ 296—65 X

FOREIGN PATENTS 522,491  6/1940  Great Britain.
561,617  5/1944  Great Britain.

BENJAMIN HERSH, *Primary Examiner.*

P. GOODMAN, *Assistant Examiner.*